United States Patent [19]

Hardwick

[11] Patent Number: 5,069,521
[45] Date of Patent: Dec. 3, 1991

[54] OPTICAL TRANSMISSION APPARATUS

[75] Inventor: David W. Hardwick, Nottingham, England

[73] Assignee: GEC Plessey Telecommunications Limited, Coventry, United Kingdom

[21] Appl. No.: 519,217

[22] Filed: May 7, 1990

[30] Foreign Application Priority Data

May 12, 1989 [GB] United Kingdom ................. 8910957

[51] Int. Cl.⁵ ............................................... G02B 6/28
[52] U.S. Cl. .......................................... 385/24; 370/16; 370/16.1; 359/110; 359/173; 359/164; 359/152
[58] Field of Search ...................... 455/600; 370/1, 16, 370/16.1; 350/96.16

[56] References Cited
U.S. PATENT DOCUMENTS 4,446,551 5/1984 Seo ..................................... 370/16.1
4,829,512 5/1989 Nakai et al. ........................ 370/1 X Primary Examiner—John D. Lee
Assistant Examiner—Stephen W. Barns
Attorney, Agent, or Firm—Fleit, Jacobson, Cohn, Price, Holman & Stern

[57] ABSTRACT

The apparatus comprises at least one standby optical fibre transmission path and at least one worker optical fibre transmission path. Each end of the paths is terminated by an associated transmit and receive electro-optic converters. The converters are connected to respective electrical protection switching devices. At least one optical switching means interfaces the electro-optic converters with the optical fibres at one end of the transmission paths and is arranged to switch the optical transmission between worker and standby fibres when a fault is detected.

2 Claims, 5 Drawing Sheets

OPTICAL TRANSMISSION APPARATUS

FIELD OF THE INVENTION

The present invention relates to the protection and testing of optical transmission apparatus.

DESCRIPTION OF PRIOR ART

Currently the only method of providing protection on such optical transmission apparatus is by electrical switching. In these circumstances the protection arrangement consists of electro-optic converters permanently connected to the protected optical fibre and preceded by electrical switches. This prior art form of protection is shown in FIG. 1 which shows a standby system and a worker number 1 system through to a worker number N system. Each system comprises a transmit and receive optical fibre 1,2, interconnecting a respective electro-optic converter 3,4 comprising a transmitter and receiver. The electro-optic converters 3,4 are connected to electrical protection switches 5. Control logic 10b is provided, and a control bus 13 interconnects the control logic 10b with the electrical protection switches 5. An alarm bus 11, and an auxiliary channel 12 interconnect the control logic 10b and the electro-optic converters 3, 4. The apparatus described in FIG. 1 is only applicable on a point-to-point basis and is intolerant of most multiple faults, (e.g. the simultaneous failure of a part of the standby system and a part of a worker system). Under these circumstances restoration cannot be achieved although sufficient working equipment is available. Faults cannot be located below system electro-optic converter -fibre- opto-electronic converter level without manual intervention.

SUMMARY OF THE INVENTION

An aim of the present invention is to provide an optical transmission apparatus having a protection and testing facility which overcomes the above mentioned problems in an efficient and economical manner.

STATEMENTS OF THE OBJECTS OF THE INVENTION

According to the present invention there is provided an optical transmission apparatus comprising at least one standby optical fibre transmission path and at least one worker optical fibre transmission path, terminated at each end by associated transmit and receive electro-optic converters which are connected to respective electrical protection switching means having input and output lines, characterised in that, at least one optical switching means is arranged to interface the electro-optic converters at one end of the optical fibre transmission paths, with the optical fibres, and switch the optical transmission between the worker and standby fibres when a fault is detected, by the electro-optic converters, in a transmission path.

According to an aspect of the present invention, an optical switching means is provided at each end of the optical fibre transmission paths which interface the electro-optic converters at each end of the paths, with the optical fibres.

According to a further aspect of the present invention, the optical switching means is arranged to interface a plurality of worker paths and a plurality of associated standby paths with a plurality of worker electro-optic converters and a single standby electro-optic converter.

According to yet a further aspect of the present invention, the optical switching means is arranged to provide local or remote loopback connections for testing purposes.

This arrangement of optical transmission apparatus has the advantage of being more tolerant in respect of multiple faults. The standby optical transmitter and receiver at each end of the standby optical transmission path, and the standby optical fibres themselves, can be used independently to by-pass faults on up to six systems simultaneously.

The standby transmitters and receivers can be used to locate faults to subsystem level (e.g. transmitter, receiver or fibre) by using the optical switches to provide local, and the electrical switches to provide remote loopback testing facilities.

In point-to-multipoint situations 1:N protection can be employed at a central node where one to one protection would previously had been required. This results in considerable economies at the central node.

BRIEF DESCRIPTION OF THE DRAWINGS

Exemplary embodiments of the present invention will now be described with reference to the accompanying drawings wherein.

DESCRIPTION OF THE PREFERRED EMBODIMENTS

Figure 1:
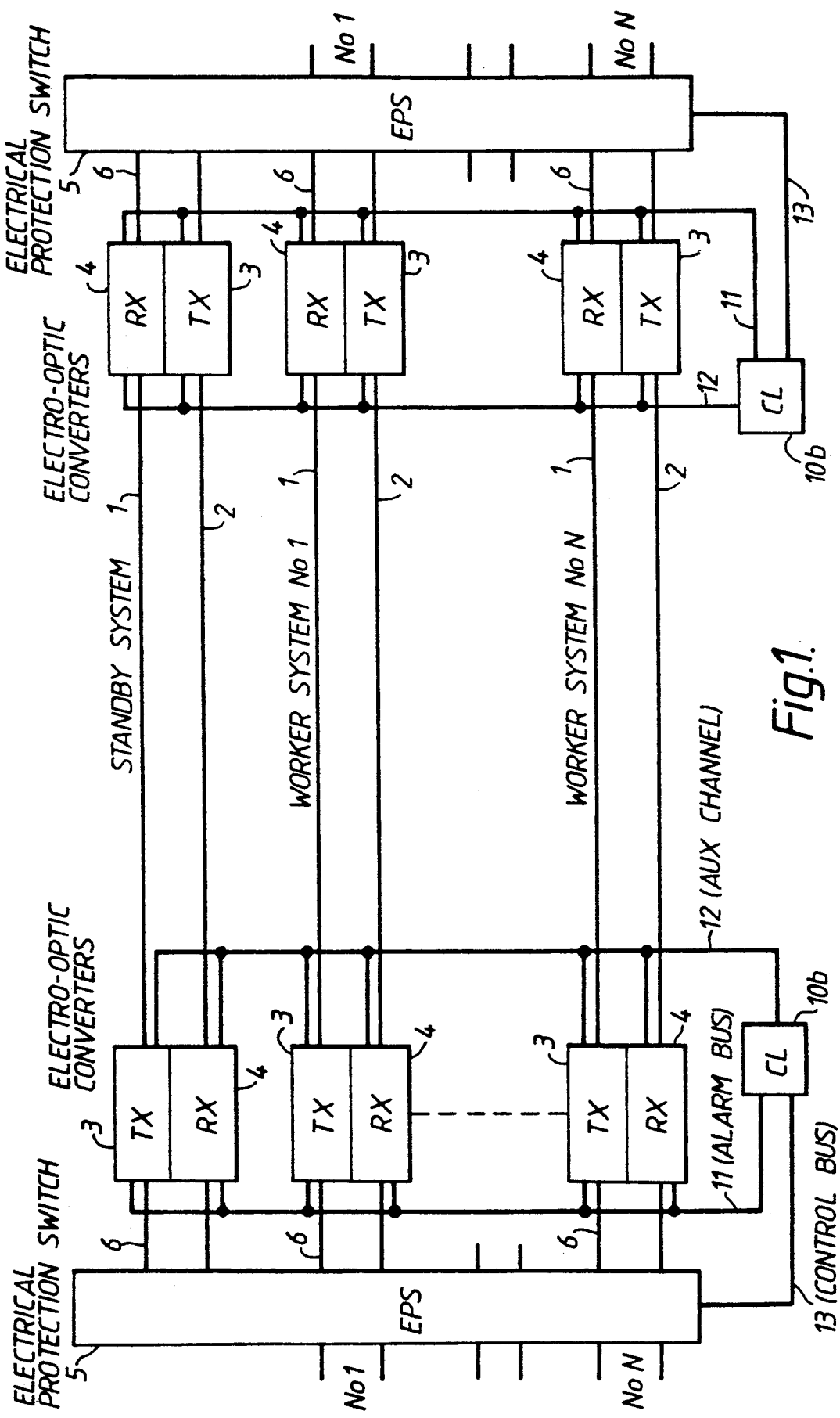
FIG. 1 shows an optical fibre transmission system according to a prior art arrangement.
Figure 2:
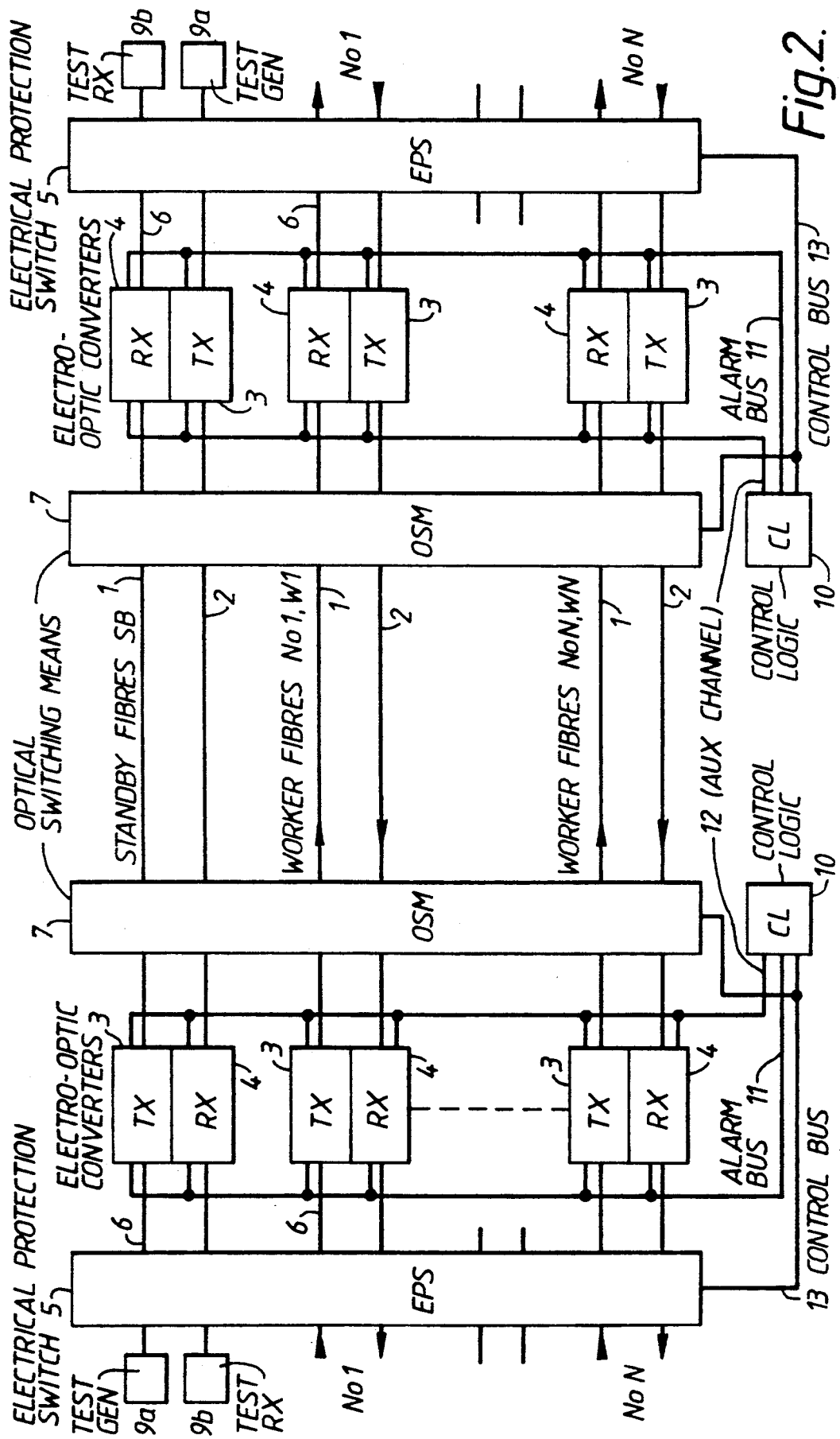
FIG. 2 shows an optical transmission system in accordance with one embodiment of the present invention.

Referring to FIG. 2, the equipment which is identical to that of the prior art arrangement of FIG. 1 bear the same reference numerals. In FIG. 2 a plurality of transmission paths are shown, a standby path SB, a first worker path W1 and an N worker path WN. It will be appreciated that a plurality of paths are provided between systems W1 and WN. Each transmission path comprises two optical fibres 1,2 for transmission in opposed directions. The optical fibre of each system is connected to an electro-optic transmitter 3 at one end and an electro-optic receiver 4 at the opposite end. The optical fibre 2 is connected to an electro-optic transmitter 3 and to an electro-optic receiver 4 at its opposite end. The transmitters and receivers at each end are connected to associated electrical protection switches EPS 5 via corresponding electrical links 6.

Typically, the electro-optic transmitters 3 and receivers 4 are provided by System 565 manufactured by the Plessey Company Limited. The Plessey System 565 is an optical fibre digital system operating at 565 Mbits/s. It is combined muldex and bothway line terminal which can handle four independent plesiochronous and CMI (code mark inversion) encoded data channels to CCITT recommendations. The electro-optic transmitter 3/receiver 4 are also provided with an auxiliary channel 12 providing a supervisory system.

The electrical protection switches 5, each provide route protection terminating equipment at each end of a transmission path to be protected. Such equipment is known in the art. The equipments at each end are linked via a data communications link providing the means for co-ordinating the switching and control activities of the two equipments. When a bit error rate is worse than a threshold value, a signal is transmitted to the equipment indicating the deterioration of transmission quality. This signal is used to determine whether to switch to a different transmission path or not. The switching is carried out by use of RF relays. Failure of any part of the electrical protection switches will normally result in traffic being maintained on the worker bearers.

Each optical fibre path end is interfaced with the associated electro-optic converters 3,4 by an optical switch means 7. An example of such a switch means is discussed in an article entitled "Switching in the Optical Domain" P. J. Duthie, Plessey Research and Technology, Research Review 1989. A fault in any optical fibre route is detected electrically by the standard alarm and fault monitoring circuits built into the electro-optic converters 3,4. Upon detection of the breakdown, the control logic 10 associated with the optical switching means 7 receives the alarm and fault conditions from the converters 3,4 and operates the optical switching means in order to select an alternative path in order to restore correct transmission. The fault detection is performed at both ends of the transmission system by virtue of the fact that an optical switching means 7 and control logic 10 is provided at each end of the route. The optical switching means 7 is so designed that the standby transmission equipment can be connected to any of the worker fibres or any of the worker equipments. Any of the worker equipments can also be connected to the standby transmission fibres.

Each electro-optic converter (3) provides an input fail alarm indication (I/PFn) and an output fail alarm indication (TxFn). Each opto-electric converter (4) provides an input fail alarm indication (FFn) and an output fail alarm indication (O/PFn). Where "n" indicates the working system number. The standby system alarms are designated "s".

All the above information is fed to the local control logic (10) via the Alarm bus (11). The local control logic, which is realised as an Intel 8086 or similar microprocessor, also receives and transmits information from/to the remote control logic via the auxiliary channel (12), built into the electro-optic/opto-electronic converters. The auxiliary channel is triplicated for security and a majority decision taken at the receiving end. The control commands are despatched via the control bus 13 to the optical switch means 7 and electrical protection switches 5. On receipt of an alarm the control logic initiates the restoration sequence designated cycle B in FIG. 4. On restoration of service it reverts to the monitoring cycle A of FIG. 4, until repairs are completed and the standby system restored to normal. For diagnostic purposes a test generator 9a and receiver 9b are connected to the out-of-service "standby" system and provision is made for manual local, (optical) and remote (electrical) loop back. The necessary commands being initiated via the control logic 10 and auxiliary channel 12.

Figure 3:
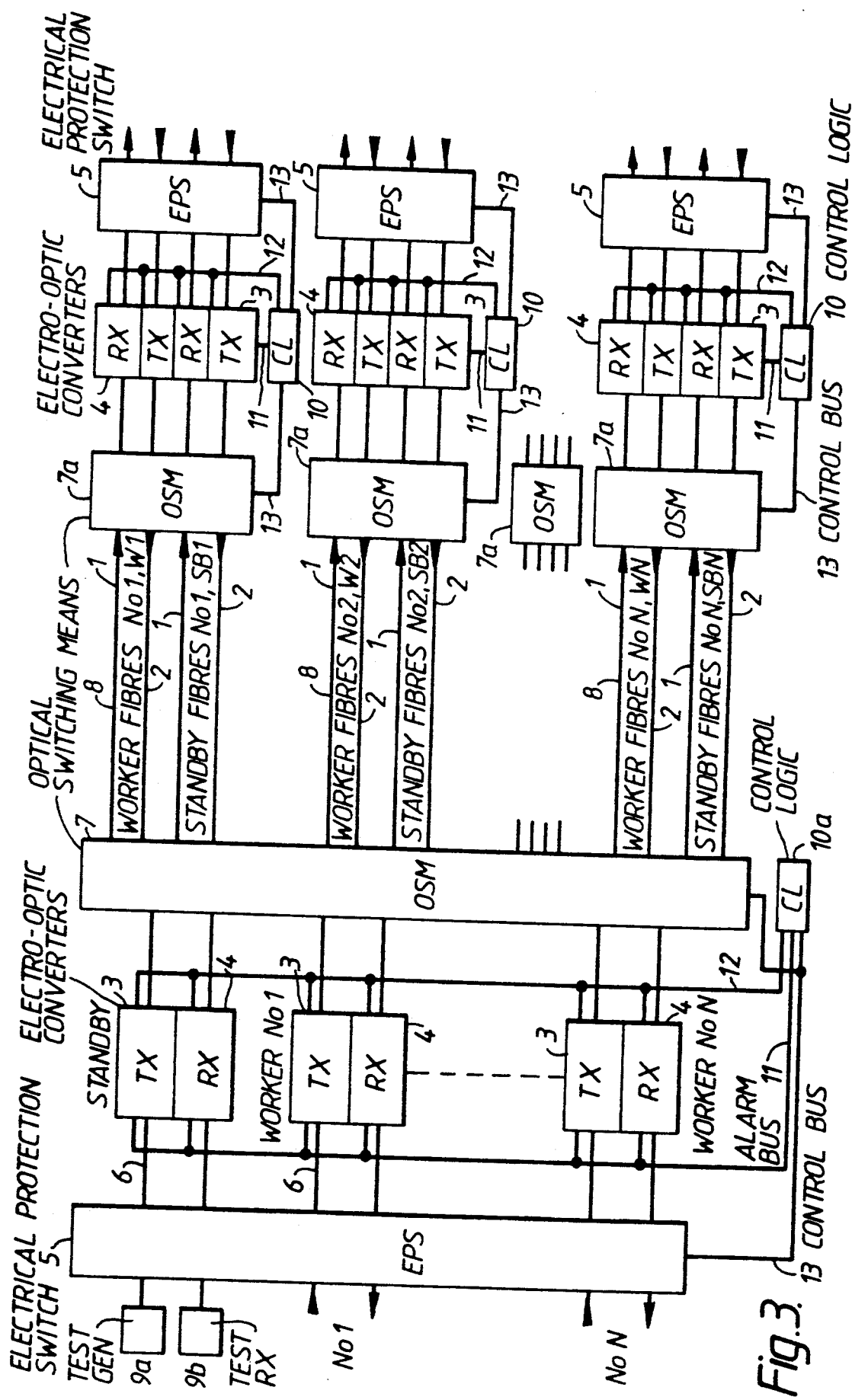
FIG. 3 shows an alternative embodiment of the present invention which shows a point-to-multipoint optical transmission system.
Figure 4A:
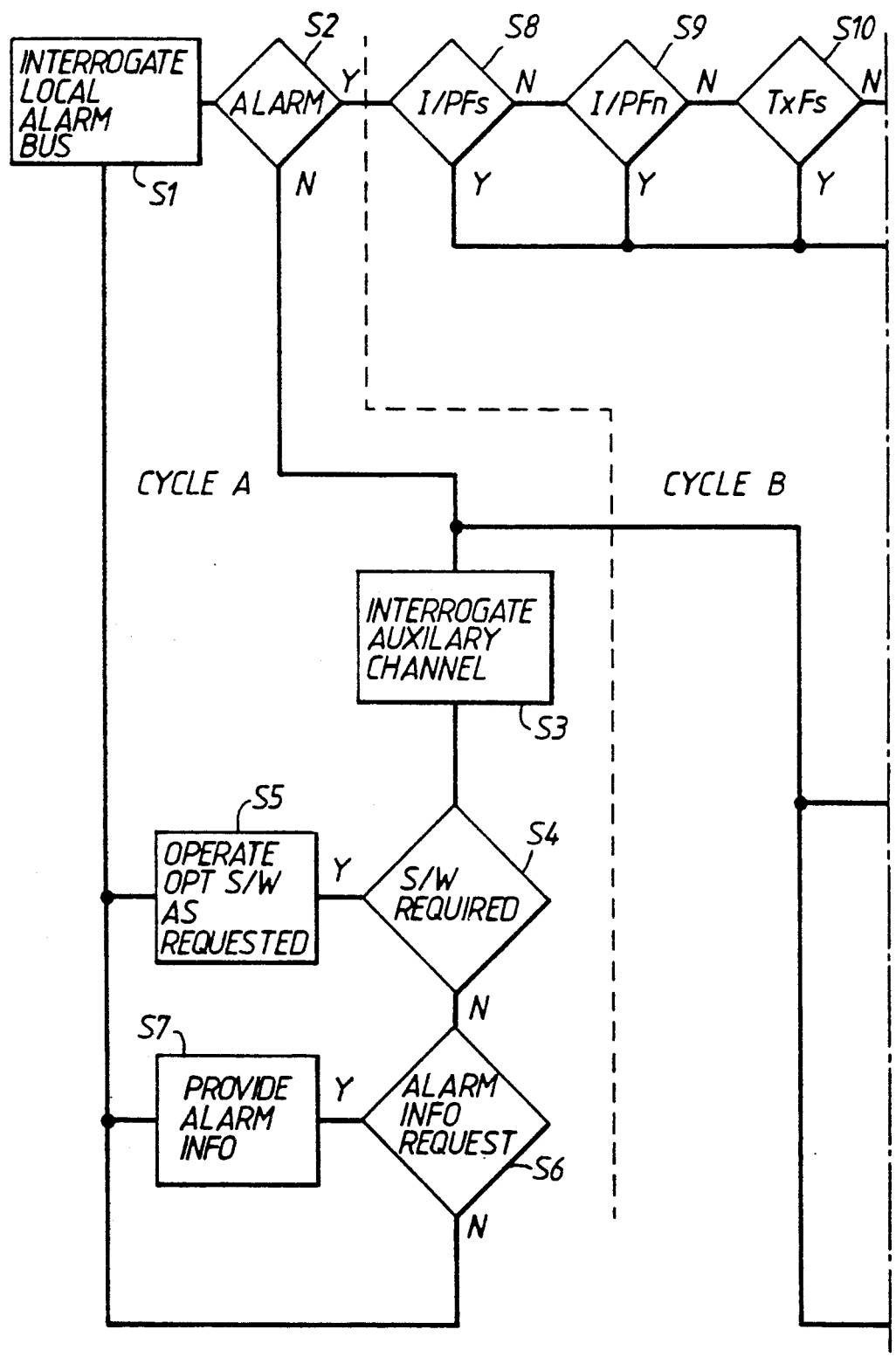
FIGS. 4A and 4B shows a flow chart of the actions taken by control logic when an alarm is received.
Figure 4B:
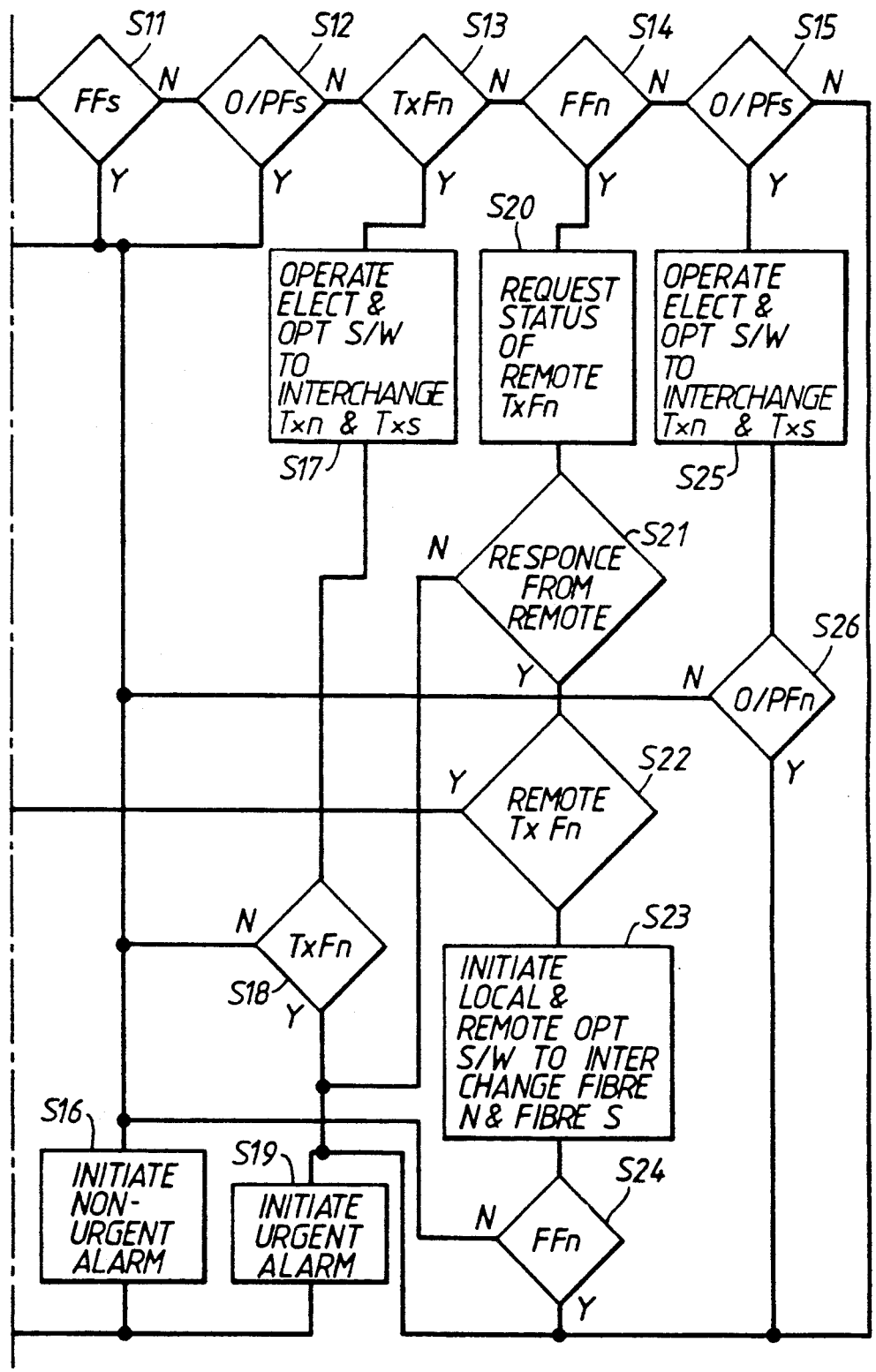

Referring to FIG. 4, a flow chart is shown of the actions taken by the control logic 10 (FIGS. 2, 3) when an alarm is received. Under normal, no fault conditions, a monitoring cycle A is performed. In step, S1 the local alarm bus is interrogated for an alarm. In step S2, if no alarm is found, the auxiliary channel is interrogated in step S3. If a switching operation is required in step S4,
the requested optical switch is operated in step S5, and step S1 is repeated. If in step S4, no switching operation is required, a check is made to see if a request has been made for alarm information. If it has, step S7 is performed and the alarm information is provided, and then step S1 is repeated. If no information is requested, step S1 is repeated.

When an alarm is found in step S2, cycle B is entered which is a restoration cycle. In steps S8–S12, checks are made to identify various faults respectively, as follows, input fail alarm on standby bearer I/PFs, input fail on bearer numbered 1 to n, I/PFn, transmit fail alarm on standby bearer TxFs, a remote input fail alarm on standby bearer FFs, an output fail alarm on standby bearer, O/PFs. Each of these steps are performed and if an alarm is detected, step S16 is performed to initiate a non-urgent alarm, and then step S3 is performed to interrogate the auxiliary channel. If no faults are found during steps S8–S12, step 13 is performed to detect a fail alarm on the transmit bearer numbered 1 to n. If a fault is detected, step S17 causes operation of the appropriate electrical and optical switch to interchange the electro-optic converter N with the standby electro-optic converters. Step S18 confirms whether the transmit fault in bearer n has been removed. If it has, then step S16 initiates a non-urgent alarm and the process returns to step S3 to interrogate the auxiliary channel. If the fault is still present step S19 is performed to initiate an urgent alarm, and the process returns to step S3.

If no fault is detected at step S13, step S14 is performed to ascertain if a fail alarm has been detected on the remote bearers numbered 1 to n. If it has, then step S20 requests the status of the remote transmit alarm of bearer number n. Step S21 acknowledges the response. If no response is received step S19 is performed to initiate an urgent alarm, followed by step S3 to interrogate the auxiliary channel. If a response is received, step S22 determines whether a electro-optic fault on remote bearer n is present. If it is, step S3 is performed. If no fault is present, step S23 is performed to initiate the local and remote optical switches to interchange fibres N and S. Step S24 then examines once again for a remote fault on bearer numbered n. If no fault is found, step S16 is performed to initiate a non-urgent alarm, followed by step S3 to interrogate the auxiliary channel. If a fault is detected, step S19 is performed to initiate an urgent alarm, and then step S3 is performed to interrogate the auxiliary channel.

If no fault is detected at step S14, step S15 is performed to ascertain whether an output fail alarm exists on bearer numbered n. If no fault is detected step S19 is performed to initiate an urgent alarm, followed by step S3 to interrogate the auxiliary channel. If a fault is detected step S25 causes the appropriate electrical and optical switches to operate to interchange the opto-electronic converter N with the standby opto-electronic converter. Step S26 confirms the absence of an output fault. If no fault is present step S16 is performed to initiate a non-urgent alarm, followed by step S3 to interrogate the auxiliary channel. If step S26 confirms a fault, step S19 is performed to initiate an urgent alarm, and then step S3 is performed to interrogate the auxiliary channel.

Referring to FIG. 3, an alternative embodiment of the present invention is shown wherein a point-to-multipoint configuration is employed. Again, common, identical equipment bears the same reference numeral. In this configuration, optical switching means 7 and control logic 10a is provided at a hub site which is connected to the associated transmit and receive electro-optic converters 3,4 which in turn are electrically connected via line 6 to an electrical protection switching means. The optical switching means 7 and control logic 10a is similarly connected to a number of systems 8, each of which comprise a worker path W1 and a standby path SB1, for example. Each path similarly comprises two optical fibre links for providing transmission in opposed directions. The optical fibre links are similarly terminated upon electro-optical fibre transmitters and receivers 3,4 in a similar manner as described with reference to FIG. 2, and are similarly connected to electrical protection switching means, EPS 5. A further optical switching means 7a and control logic 10 may be provided, connected between the opposite end of the systems 8 and the electro-optic converters 3,4. This provision provides enhanced security and gives greater flexibility in securing the optical transmissions in the event of a failure. Only one standby electro-optic converter is required, at the central point end to serve the multi-point configuration.

Using the arrangement shown in FIG. 3, each multi-point system is provided with its worker and standby paths and therefore, the optical switching means 7, and 7a when provided, are caused to operate to switch between the two systems when the associated alarm and fault detection circuitry provided in the transmit and receive electro-optic converters 3,4 detect a fault.

In the arrangement of FIG. 3 the objective is to reduce the provisioning cost at the hub site by enabling single standby equipment to be used to protect a number of worker systems with different destinations. At the hub site the control logic 10a also performs the sequence of FIG. 4, already described. Since it is not possible for the remote control logic to communicate with the hub site in the event of simultaneous failure of both electro-optic converters the hub site also sequentially tests each remote standby equipment and fibre by connecting it to the hub standby equipment and checking its performance is within special limits by use of a test generator 9a and a test receiver 9b. If the remote site fails to respond to requests for information via the auxiliary channel 12 then failure of the remote worker and standby units is assumed and an urgent alarm raised.

The above description discusses two embodiments of the present invention, however it will readily be appreciated by those skilled in the art that further embodiments exist within the spirit of the invention. For example, the standby transmitters and receivers can be used to locate faults to subsystem level (e.g. transmitter, receiver, or fibre) by using the optical switches to provide local, and the electrical switches to provide remote loopback testing facilities.

I claim:

1. Optical transmission apparatus comprising:
   a plurality of worker optical fibre transmission paths;
   a plurality of standby optical fibre transmission paths;
   a plurality of transmit and receive electro-optic converters connected to terminate both ends of respective ones of said plurality of worker and standby optical fibre-transmission paths;
   electrical protection switching means connected to and interfacing with said plurality of transmit and receive electro-optic converters at both ends of said worker and standby optical fibre transmission paths for switching optical transmission between the worker and standby optical fibre transmission paths when a fault is detected in a transmission path;
   a single standby electro optic converter;
   optical switching means arranged to interface said worker transmission paths and said standby transmission paths with said plurality of transmit and receive electro-optic converters and said single standby electro-optic converter; and
   microprocessor based control logic means coupled to said plurality of transmit and receive electro-optic converters and said standby electro-optic converter by an alarm bus, and to each electrical protection switch means and said optical switching means by a control bus, said microprocessor monitoring alarm indications on the alarm bus and taking action based upon alarm indications to instruct the electrical protection switching means and the optical switching means to operate when a fault is identified thereby setting up an alternative transmission path.

2. Optical transmission apparatus as claimed in claim 1, wherein the standby electro-optic converter is located at a hub site, and the control logic means at the hub site monitors the alarm indications.

* * * * *